(12) United States Patent
Uda et al.

(10) Patent No.: US 7,463,829 B2
(45) Date of Patent: Dec. 9, 2008

(54) OPTICAL TRANSMISSION APPARATUS AND CONTROL METHOD THEREFOR

(75) Inventors: Tetsuya Uda, Yokohama (JP); Kenta Noda, Yokohama (JP); Yasuhiro Uchiyama, Yokohama (JP); Hiroshi Masuda, Yokohama (JP); Hiroyuki Nakano, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 547 days.

(21) Appl. No.: 11/019,736

(22) Filed: Dec. 23, 2004

(65) Prior Publication Data

US 2005/0213968 A1 Sep. 29, 2005

(30) Foreign Application Priority Data

Mar. 25, 2004 (JP) .............................. 2004-089030

(51) Int. Cl.
*H04J 14/02* (2006.01)
*H04B 10/16* (2006.01)

(52) U.S. Cl. ............................ 398/97; 398/31; 398/37; 398/181; 398/177

(58) Field of Classification Search .................. 398/30, 398/31, 37, 97, 177, 181; 359/341.41, 341.42
See application file for complete search history.

(56) References Cited

U.S. PATENT DOCUMENTS

| | | | |
|---|---|---|---|
| 6,639,716 B1 * | 10/2003 | Tomofuji | 359/337.12 |
| 7,251,072 B2 * | 7/2007 | Ohtani et al. | 359/341.3 |
| 2001/0022684 A1 | 9/2001 | Kobayashi | |
| 2003/0147123 A1 * | 8/2003 | Kinoshita et al. | 359/341.3 |
| 2003/0223106 A1 * | 12/2003 | Lee et al. | 359/341.33 |
| 2004/0197105 A1 * | 10/2004 | Khatana et al. | 398/173 |
| 2004/0264956 A1 * | 12/2004 | Touma | 398/37 |
| 2005/0157380 A1 * | 7/2005 | Hatae et al. | 359/341.41 |
| 2005/0270635 A1 * | 12/2005 | Shukunami et al. | 359/337 |
| 2006/0126165 A1 * | 6/2006 | Tian et al. | 359/337 |
| 2006/0198017 A1 * | 9/2006 | Inagaki et al. | 359/337 |
| 2007/0165299 A1 * | 7/2007 | Sugaya et al. | 359/337.4 |
| 2007/0201876 A1 * | 8/2007 | Sugaya | 398/141 |

FOREIGN PATENT DOCUMENTS

JP 2001-257646 9/2001

OTHER PUBLICATIONS

Proceedings of the 1996 Communications Society Conference of the Institute of Electronics, Information and Communication Engineers (IEICE), Lecture No. B1096.

* cited by examiner

*Primary Examiner*—Leslie Pascal
(74) *Attorney, Agent, or Firm*—McDermott Will & Emery LLP

(57) ABSTRACT

An optical transmission apparatus comprising a first detector for detecting the power of the supervisory signal light separated from received wavelength-division multiplexed signal lights; a second detector for detecting the power of the wavelength-division multiplexed signal lights after the separation of the supervisory signal light; a gain-controlled type optical amplifier for amplifying the wavelength-division multiplexed signal lights; an optical attenuator coupled to the amplifier; and a control unit for controlling the optical amplifier and the optical attenuator so as to keep the output level of the wavelength-division multiplexed signal lights to a predetermined target value, wherein the control unit restrains automatic output level control by the optical attenuator when the supervisory signal light power fluctuates within its permissible range and fluctuations in the signal light power have deviated from its permissible range.

12 Claims, 10 Drawing Sheets

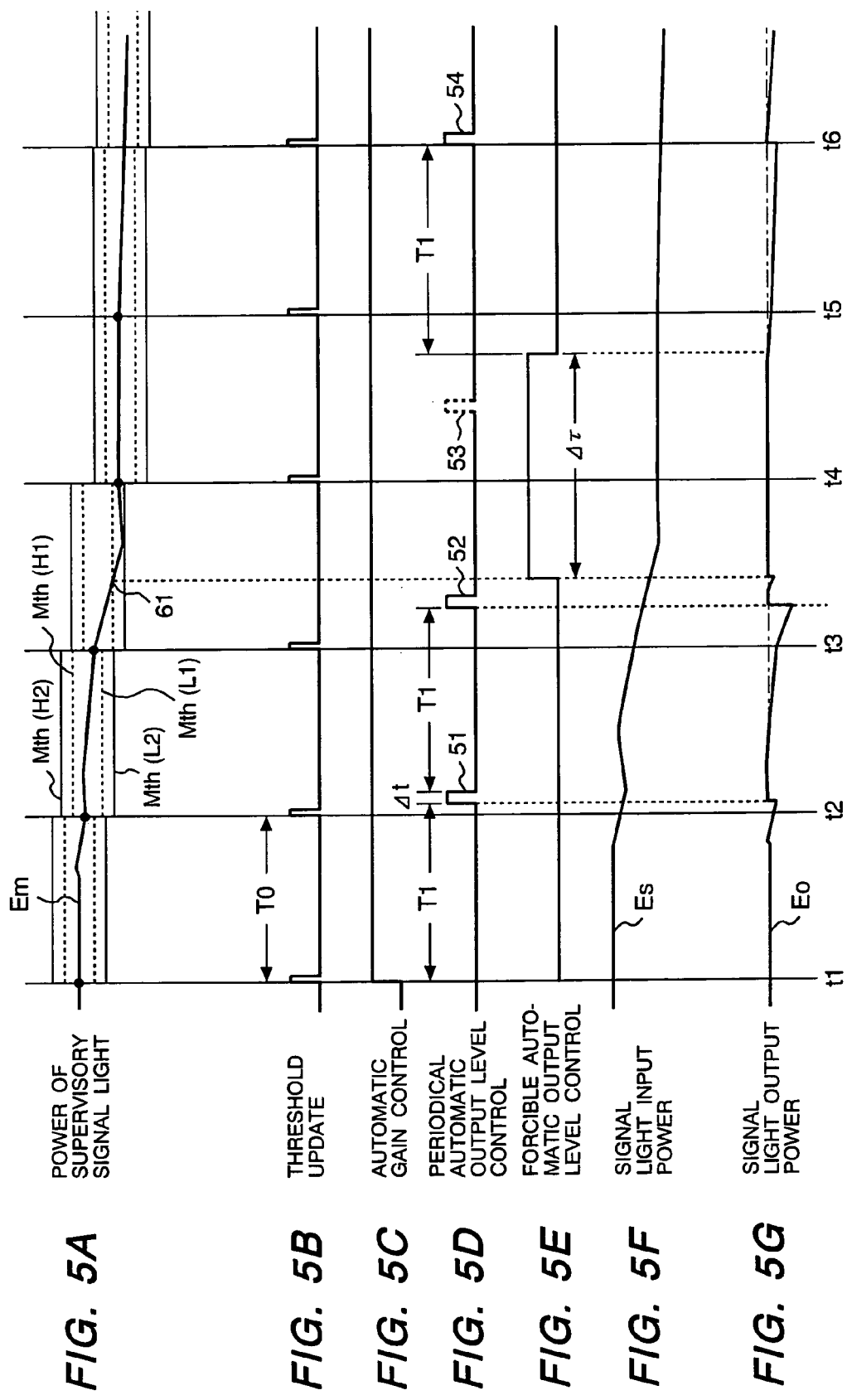

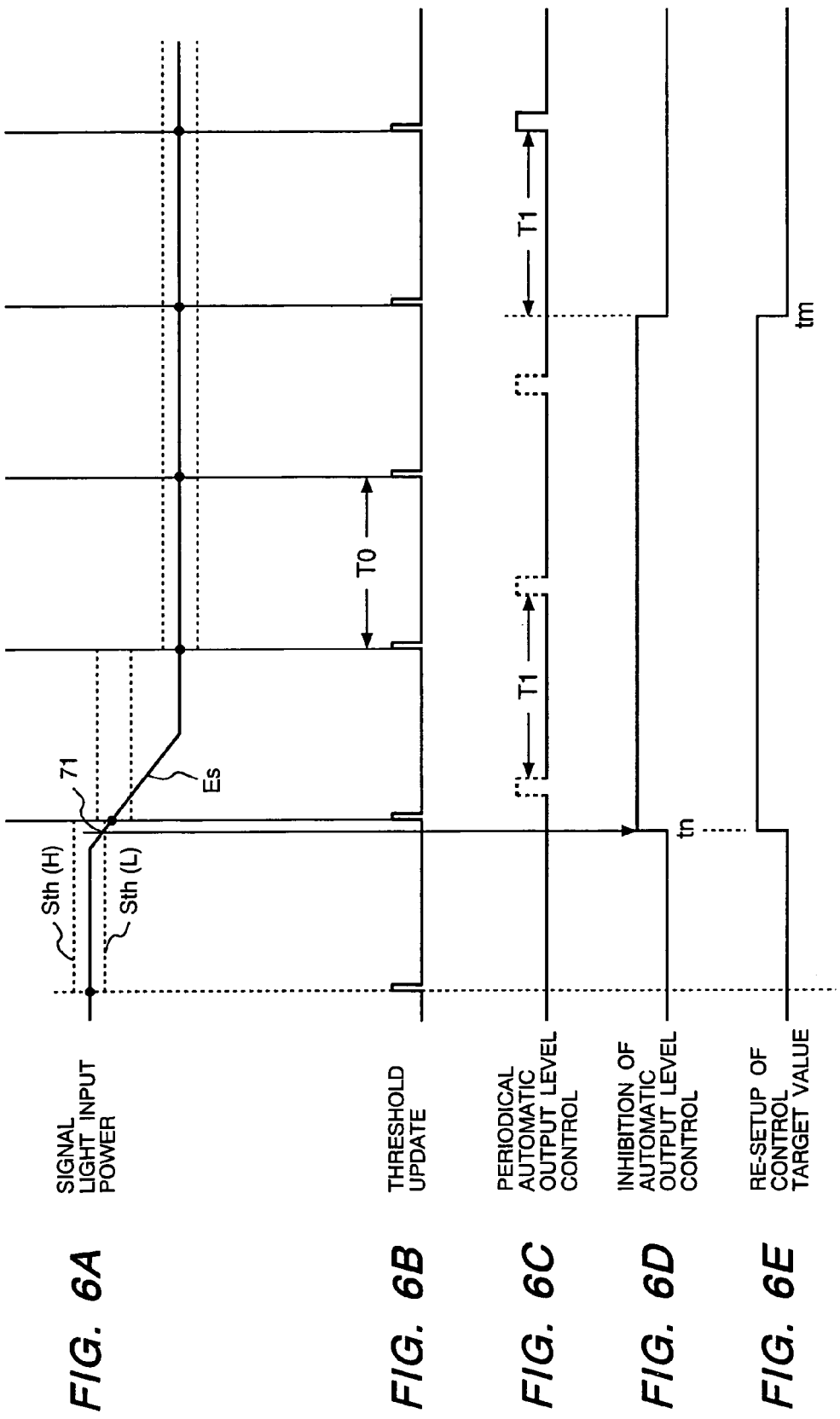

OPTICAL TRANSMISSION APPARATUS AND CONTROL METHOD THEREFOR

CLAIM OF PRIORITY

The present application claims priority from Japanese application serial No. P2004-089030, filed on Mar. 25, 2004, the content of which is hereby incorporated by reference into this application.

BACKGROUND OF THE INVENTION (1) Field of the Invention

The present invention relates to an optical transmission apparatus and a control method therefor, and more particularly to an optical transmission apparatus and a control method therefor to be used in an optical transmission system which wavelength-division multiplexes a plurality of signal lights and transmits the multiplexed signal lights.

(2) Description of the Related Art

Wavelength-division multiplexing optical transmission for transmitting a plurality of signal lights differing in wavelength bundled into a single optical fiber is generally applied to optical communication systems with a view to increasing the communication capacity and reducing the system cost. In an actual system, in order to compensate for optical signal losses arising in the optical fiber, which serves as the transmission path between two distant points, an optical fiber amplifier is installed on the transmission path, and a plurality of signal lights differing in wavelength are collectively subjected to signal amplification without converting them into electric signals on the way of transmission.

The amplification rate (amplification gain) of an optical fiber amplifier is dependent on the wavelength of signal lights. For instance, in the case of an optical fiber amplifier for amplifying optical signals in a wavelength range of 1530 nm to 1560 nm, the amplification gain of signal lights in the vicinity of 1530 nm is greater than that of signal lights in the vicinity of 1560 nm. For this reason, when collectively amplifying a plurality of multiplexed signal lights differing in wavelength, the flattening of gains depending on the wavelength is required. For the purpose of such gain flattening, a dielectric multi-layered film filter or a gain flattening filter using fiber Bragg grating, for instance, is mounted within the optical fiber amplifier.

The wavelength-dependence of the amplification gain varies with the optical input power of the optical fiber amplifier. In other words, as the wavelength-dependence of the gain varies with ups and downs of the gain of the optical fiber amplifier, even an optical amplifier equipped with a gain flattening filter can achieve gain flattening only while the gain of the optical fiber amplifier is maintained at its designed level. For this reason, in an optical fiber amplifier, in order to flatten the gains of multiplexed signal lights of a plurality of wavelengths, automatic gain control is performed to keep the gain constant all the time by monitoring the powers of input and output lights.

Further in an optical transmission system, to cope with the limitation of the input dynamic range of a receiver, the non-linear effect of the optical fiber and the like, automatic output level control is performed to keep the output signal light power of each wavelength constant, in parallel with the aforementioned automatic gain control. In an optical transmission system having no automatic output level control function, as a variation in losses on the transmission path leads to a variation in the power of input optical signals of an optical amplifier for signal relaying, and the power of output optical signals of the optical amplifier also varies, eventually the power of optical signals inputted to an optical transmission apparatus on the receiving side may vary to cause the input signal level of a receiver to deviate from the dynamic range.

In order to keep the power of optical signals to be inputted to the receiver constant, for instance, an optical attenuator may be inserted on the signal path of the optical fiber amplifier to adjust the attenuation factor according to the losses arising on the transmission path on the signal input side. Since the wavelength-dependence of the extent of attenuation in the optical attenuator is not affected by the optical input power, combination of an optical fiber amplifier and an optical attenuator makes possible both automatic gain control and automatic output level control.

Automatic gain control in an optical fiber amplifier can be achieved by, for instance, observing the powers of wavelength-division multiplexed signal lights on the input and output sides of the optical fiber amplifier, and controlling the pumping power of the amplifier so as to keep the power ratio (gain) between the input signal lights and the output signal lights constant all the time. Automatic output level control for each wavelength can be accomplished by, for instance, figuring out the total output optical power of the optical fiber amplifier from a predetermined number of multiplexed signal lights (the number of multiplexed wavelengths) and the output optical power of each wavelength, and controlling the extent of attenuation of the optical attenuator so as to bring the total output optical power of the optical fiber amplifier to a desired level.

However, the automatic output level control method described above involves a problem when a difference arises between the number of multiplexed wavelengths, which is the condition for figuring out the total output optical power, and the number of wavelengths of the multiplexed signal lights actually entered into the optical fiber amplifier. In an optical transmission system, the number of signal lights to be wavelength-division multiplexed (the number of wavelengths) into the optical fiber will change, for instance, when one of a plurality of transmitters coupled to the optical fiber runs into trouble or an optical fiber coupling the transmitter with the wavelength multiplexer comes off.

In this case, since each optical fiber amplifier cannot recognize the number of actually multiplexed wavelengths at that moment when the trouble has occurred, matching between the number of wavelengths, which is a precondition for the automatic output level control, and the number of wavelengths physically multiplexed on the optical fiber cannot be achieved. Therefore, when optical signals of a certain wavelength becomes absent on account of maintenance work or trouble, if automatic output level control of the fiber amplifiers is performed targeting on a total output optical power calculated on the basis of a greater number of signal lights than that of signal lights actually multiplexed, the output optical power per signal light will become higher than the expected level, resulting in a problem that each signal light eventually reaches the receiver at an excessively high input signal level.

To address such problems, for instance, in the Proceedings of the 1996 Communications Society Conference of the Institute of Electronics, Information and Communication Engineers (IEICE), Lecture No. B1096 (Non-Patent Reference 1), there is proposed an optical amplifier output level control for WDM which performs control so as to bring the output power per signal light to a desired level by detecting the total signal light power outputted from the optical amplifier and the number of wavelengths accommodated in the system. Further, in the Japanese Unexamined Patent Application Laid-Open No.

2001-257646 (Patent Reference 1), there is proposed a method for extracting a supervisory signal light for monitor and control, known as a pilot or probe signal light, with a branching element provided on the output side of an optical amplifier and controlling the optical amplifier so as to keep the optical power of the probe signal light constant.

In the conventional optical amplifier, it is supposed that the velocity of loss variations on the transmission path is sufficiently slower than the control velocity of the optical amplifier while the transient response of signal power variations due to change in the number of wavelengths to be multiplexed is sufficiently faster than the control velocity of the optical amplifier, and the above two varying factors are discriminated from each other by the difference in the variation velocity of optical signal power observed with an optical transmission apparatus. Any change in the number of wavelengths is an event that occurs in an operation to alter the communication path linking the sending point and the receiving point for instance, and the varying velocity of the number of wavelengths is supposed to be not more than a few hundred μs. On the other hand, any variation in losses is an abnormal event that occurs, for instance, when the maintenance personnel of the optical transmission system pulls or catches the optical fiber, and the varying velocity of losses on the transmission path is supposed to be not less than a few ms.

To take note of this difference in varying velocity, it is able to determine whether any variation in signal power is due to a loss variation on the transmission path or due to a change in the number of wavelengths by setting a threshold of a frequency regarding the variation in total signal power to be detected from the multiplexed input signal lights of the optical amplifier and judging whether the velocity of variation in the total signal power due to the occurrence of a given event has exceeded the frequency threshold. It is also possible to determine the control mode of the optical amplifier to be executed in accordance with the identified cause of the total signal power variation. As the control mode of the optical amplifier, automatic output level control should be performed when a loss variation-occurs and automatic gain control should be performed when a variation in the number of wavelengths occurs. No mismatching between the event that has actually occurred and the selected control mode is permissible.

However, by the above-described method to determine the nature of an event with reference to a frequency threshold, if a variation in the number of wavelengths occurs at a low velocity in or above the ms order, for instance, the variation in total signal power will not be perceived as being consequent on a variation in the number of wavelengths but will be erroneously attributed to a loss variation on the transmission path. In this case, automatic output level control having as its target value an output optical power of the optical amplifier is selected, resulting in a wrong control operation to increase the signal light power of each wavelength more than required. Furthermore, whereas two control modes including automatic output level control to compensate for variations in signal power due to loss variations and automatic gain control to compensate for variations in signal power due to variations in the number of wavelengths coexist in the optical amplifier, if it is difficult to identify the cause of variations as mentioned above, the two control modes may be executed at the same time with an adverse effect on signal quality even though one or the other type of variation causes has occurred.

The method proposed in Non-Patent Reference 1 to control the optical amplifier by detecting the number of multiplexed wavelengths involves the problem of permitting proper responses only to relatively slow loss variations on the transmission path or relatively fast variations in the number of wavelengths. Furthermore, since automatic output level control is always at work according to Non-Patent Reference 1, the optical amplifier may erroneously operate not only when an abnormal event has occurred but also in response to a normal operation by the system administration staff.

According to Patent Reference 1, as automatic output level control or automatic gain control of the optical amplifier is performed by taking note only of power variations in the probe signal light, there is no need to discriminate the causes of variations in signal light power unlike in Non-Patent Reference 1. Furthermore, since there is no particular restriction on the response time constant of the optical amplifier, fast loss variations on the transmission path at or below a few ms or slow variations in the number of wavelengths at or above a few ms can be coped with. According to Patent Reference 1, however, as the control of the optical amplifier is dependent on a specific probe signal light, there is a problem that, if any abnormality of the probe signal light arises for some reason such as a failure in the light source, the optical amplifier will become uncontrollable, inviting a trouble in the transmission of signal lights.

SUMMARY OF THE INVENTION

An object of the present invention is to provide an optical transmission apparatus and a control method therefor which can secure satisfactory communication quality by appropriately controlling the power of each signal light not only in a normal state in which neither a loss on the transmission path varies nor the number of multiplexed wavelengths changes, but also in an abnormal state where a loss variation on the transmission path or a change in the number of multiplexed wavelengths has occurred.

Another object of the invention is to provide an optical transmission apparatus and a control method therefor which can control the optical amplifier output in an appropriate control mode corresponding to the cause of a light power variation, irrespective of the velocity of the light power variation due to the occurrence of an abnormal event.

In order to achieve the objects stated above, an optical transmission apparatus according to the invention comprises first means for separating a supervisory signal light from received wavelength-division multiplexed signal lights and detecting the power of the supervisory signal light; second means for detecting the power of the wavelength-division multiplexed signal lights after the separation of the supervisory signal light; a gain control type optical amplifier for amplifying the wavelength-division multiplexed signal lights; an optical attenuator variable in the extent of attenuation for adjusting the power level of the wavelength-division multiplexed signal lights outputted from the optical amplifier; and a monitor and control unit for controlling the optical amplifier to keep a constant gain and controlling the extent of attenuation of the optical attenuator so that the output power of the wavelength-division multiplexed signal lights has a predetermined target value, wherein the monitor and control unit monitors the power level of the supervisory signal light and that of the wavelength-division multiplexed signal lights outputted from the first and second means, respectively, and restrains automatic output level control by the optical attenuator when the power of the supervisory signal light fluctuates within its permissible range and fluctuations in the power of the wavelength-division multiplexed signal lights deviate from its permissible range.

One feature of the invention resides in that the monitor and control unit executes automatic output level control by the optical attenuator intermittently in predetermined cycles T1 for a period Δt when the power of the supervisory signal light is fluctuating within the permissible range.

Another feature of the invention resides in that the monitor and control unit executes the automatic output level control by the optical attenuator intermittently in predetermined cycles when the power of the supervisory signal light is fluctuating within the permissible range, and performs automatic output level control by the optical attenuator forcibly for a predetermined period Δτ which is longer than the period Δt when the power of the supervisory signal light fluctuates beyond the permissible range.

Still another feature of the invention resides in that the monitor and control unit executes, when the power of the supervisory signal light fluctuates beyond the permissible range, automatic output level control by the optical attenuator forcibly for a predetermined period Δτ if the power of the supervisory signal light is within a predetermined output control range, and terminates both the intermittent automatic output level control and forcible automatic output level control by the optical attenuator if the power of the supervisory signal light fluctuates beyond the output control range.

Still another feature of the invention resides in that the monitor and control unit updates the values of thresholds for detecting fluctuations in the supervisory signal light power and the values of thresholds for detecting fluctuations in the signal light power at predetermined intervals T0.

According to an embodiment of the invention, when the wavelength-division multiplexed signal light power has deviated from its permissible range during the period of automatic output level control, the automatic output level control is suspended. Further, the monitor and control unit updates the values of the thresholds for defining the permissible ranges at regular intervals T0, depending on the observed supervisory signal light power and the wavelength-division multiplexed signal light power, so that the variations in the supervisory signal light power and in the wavelength-division multiplexed signal light power are monitored with reference to the variable thresholds.

In another embodiment of the invention, the optical transmission apparatus is provided with a supervisory signal light transmitter for generating a supervisory signal light to be transmitted to the optical transmission path of a next section, and the monitor and control unit notifies the occurrence of any loss variation in the preceding section to the following optical transmission apparatus by varying the power of the supervisory signal light outputted from the supervisory signal light transmitter according to the supervisory signal light power outputted from the first means. The notification of any loss variation in the preceding section to the following optical transmission apparatus can also be accomplished by varying the power of the supervisory signal light outputted from the supervisory signal light transmitter according to the signal light power outputted from the optical amplifier. By transmitting any loss variation in the preceding section by varying the power of the supervisory signal light in this way, even if wavelength-division multiplexed signal lights are transmitted to the next section in a wrong state in which power compensation in accordance with loss variations is incomplete, for instance, the next optical transmission apparatus can prevent from mistaking the cause of the occurrence of signal light power variation for a change in the number of multiplexed wavelengths.

A control method for an optical transmission apparatus according to the invention is comprised of the steps of: detecting the power of the supervisory signal light separated from received wavelength-division multiplexed signal lights; detecting the power of the wavelength-division multiplexed signal lights after the separation of the supervisory signal light; amplifying the wavelength-division multiplexed signal lights with a constant gain; executing automatic output level control of the wavelength-division multiplexed signal lights according to a predetermined target value; and monitoring the detected supervisory signal light power and the detected wavelength-division multiplexed signal light power, and restraining the automatic output level control when the supervisory signal light power is fluctuating within its permissible range and fluctuations in the wavelength-division multiplexed signal light power has deviated from its permissible range.

When any loss fluctuation arises on an optical transmission path on which the supervisory signal light and the wavelength-division multiplexed signal lights are carried, both the supervisory signal light and the multiplexed signal lights vary in optical power. However, in the case where the number of multiplexed signal lights (the number of wavelengths) varies on the upstream side, only the power of multiplexed signal lights varies. Using this characteristic in an optical transmission system, the optical transmission apparatus according to the invention judges that, when the supervisory signal light power fluctuates within its permissible range and fluctuations in the wavelength-division multiplexed signal light power deviates from its permissible range, the cause of the fluctuations in the multiplexed signal light power is a change in the number of multiplexed wavelengths, and the automatic output level control by the optical attenuator is restrained.

According to the invention, therefore, erroneous adjustment of the multiplexed signal light power due to the execution of automatic output level control for the optical amplifier output power can be avoided when the number of multiplexed wavelengths has changed. Further, according to the invention, periodical automatic output level control is executed as long as the supervisory signal light power fluctuates within the permissible range, and forcible optical power automatic output level control is executed for a predetermined period when the supervisory signal light power deviates from its permissible range on account of a loss variation on the transmission path. As a result, the present invention can control the multiplexed signal light output power in accordance with the target value irrespective of the velocity of loss fluctuations, thereby providing an optical transmission system having guaranteed quality of communication.

In an embodiment of the invention, by executing automatic gain control of the optical amplifier all the time and automatic output level control intermittently for a short period at a time as long as fluctuations in the supervisory signal light power are within the permissible range, the duration of parallel execution of automatic output level control and automatic gain control is minimized. Intermittent execution of automatic output level control for a short period at a time can reduce the probability of a change in the number of multiplexed wavelengths during automatic output level control than in constant execution of automatic output level control as proposed in Non-Patent Reference 1. Therefore, even when the number of multiplexed wavelengths has changed, the occurrence of erroneous adjustment of the multiplexed signal light power can be reduced.

Further, according to the invention, forcible automatic output level control is carried out for a predetermined period when the supervisory signal light power has deviated from the permissible range, and the automatic output level control is suspended if fluctuations in the multiplexed signal light power deviate from its permissible range during when the automatic output level control is carried out. Accordingly, it is able to reduce the occurrence of erroneous adjustment of the multiplexed signal light power in the event of a change in the number of multiplexed wavelengths even when automatic output level control is taking place.

BRIEF DESCRIPTION OF THE DRAWINGS

FIG. 5A through FIG. 5G illustrate relationships among the conditions for execution of the periodical automatic output level control and forcible automatic output level control to be executed by a monitor and control unit 20 and the signal light output power of the optical amplifier 30.

FIG. 6A through FIG. 6E illustrate operations to restrain the automatic output level control executed by the monitor and control unit 20.

DETAILED DESCRIPTION OF THE PREFERRED EMBODIMENTS

A wavelength-division multiplexing optical transmission system and a control method therefor according to the present invention will be described in detail by referring to the accompanying drawings.

Figure 1:
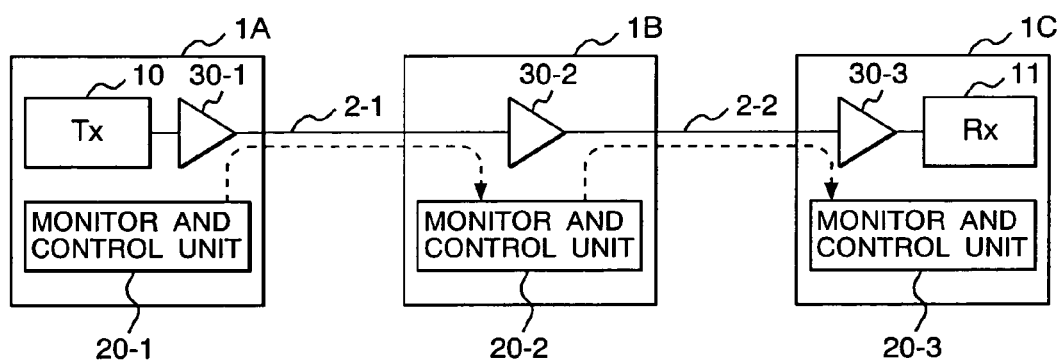
FIG. 1 shows a schematic configuration of a wavelength-multiplex optical transmission system to which the present invention is applied.

FIG. 1 shows a schematic configuration of a wavelength-division multiplex optical transmission system to which the present invention is applied.

The optical transmission system comprises a plurality of optical transmission apparatuses 1 (1A, 1B and 1C) connected by optical fibers 2 (2-1 and 2-2) constituting the transmission path. Signal lights transmitted from a transmitter 10 mounted on the optical transmission apparatus 1A, after being amplified by a transmit optical amplifier 30-1, reach the optical transmission apparatus 1C on the opposite side via the optical fiber 2-1, the relaying optical transmission apparatus 1B and the optical fiber 2-2, and received by a receiver 11 of the optical transmission apparatus 1C. The signal lights transmitted by the optical transmission apparatus 1A are reduced in optical power by propagation losses while passing the optical fibers 2 (2-1, 2-2). To compensate for this power drop, the optical transmission apparatus 1B is mounted with a relaying optical amplifier 30-2 and the optical transmission apparatus 1C is mounted with a receiving optical amplifier 30-3.

Each of the optical transmission apparatuses 1 (1A through 1C) is provided with a monitor and control unit 20 (one of 20-1 through 20-3). As indicated by broken lines, a supervisory signal light transmitted from the monitor and control unit 20-1 of the optical transmission apparatus 1A to the optical fiber 2-1 is received by the monitor and control unit 20-2 of the adjacent relaying optical transmission apparatus 1B, and another supervisory signal light transmitted from the monitor and control unit 20-2 to the optical fiber 2-2 is received by the monitor and control unit 20 of the optical transmission apparatus 1C. The supervisory signal lights carry some items of control information, required by the optical transmission apparatuses, such as alarm information, status information of the apparatus, and the number of multiplexed signal lights.

According to the invention, as indicated by the broken lines, the supervisory signal light transmitted from the monitor and control unit 20-1 of the optical transmission apparatus 1A is separated from wavelength-division multiplexed signal lights before the optical amplifier 30-2 of the relaying optical transmission apparatus 1B, and inputted into the monitor and control unit 20-2. The supervisory signal light transmitted from the monitor and control unit 20-2 is multiplexed with wavelength-division multiplexed signal lights on the output side of the optical amplifier 30-2 and separated from the wavelength-division multiplexed signal lights before the optical amplifier 30-3 of the optical transmission apparatus 1C, so as to be inputted into the monitor and control unit 20-3.

Thus, according to the invention, only the wavelength-division multiplexed signal lights are inputted into the optical amplifiers 30. Therefore, if any loss variation occurs in the optical fiber 2-1 section for instance, both the supervisory signal light inputted into the monitor and control unit 20-2 and the input/output power of the optical amplifier 30-2 vary in the relaying optical transmission apparatus 1B, but if the number of signal lights (the number of wavelengths) transmitted from the optical transmission apparatus 1A to the optical fiber 2-1 increases or decreases, only the optical input power of the optical amplifier 30-2 will vary, and the power of the supervisory signal light inputted into the monitor and control unit 20-2 will not vary.

According to the invention, the monitor and control unit 20-2 monitors the powers of input/output signal lights of the optical amplifier 30-2 and that of the supervisory signal light, and identifies the cause of the signal light variation according to whether the variation occurs in both the input/output signal lights and the supervisory signal light or only in the input/output signal lights. The monitor and control unit 20-2 performs automatic gain control of the optical amplifier 30-2 all the time as long as at least one signal light is inputted into the optical amplifier 30-2 in order to cope with any variation in signal light power due to a change in the number of multiplexed wavelengths.

One of the features of the invention resides in that the monitor and control unit 20-2 performs periodical automatic output level control of multiplexed signal lights outputted from the optical amplifier 30-2 in parallel with the automatic gain control, and the monitor and control unit 20-2 performs, instead of the periodical automatic output level control, forcible automatic output level control for a predetermined period when relatively large amount of a power variation is detected in the supervisory signal light and it is judged that losses on the optical fiber 2-1 have varied fairly. The periodical automatic output level control is executed for a relative short period Δt at regular intervals T1, and the extent of attenuation of an optical attenuator is adjusted to match the total output signal power of the optical amplifier 30-2 with its target. Under the forcible automatic output level control, the adjustment of the extent of attenuation of the optical attenuator is performed for a period Δτ, which is longer than the period Δt.

Another feature of the invention resides in that the monitor and control unit 20-2 restrains the execution of the periodical or forcible automatic output level control, when it has detected any change in the number of multiplexed wavelengths, namely it has detected a variation in optical power beyond the permissible range of the input/output signals of the optical amplifier 30-2 though the power of the supervisory signal light has not varied beyond its own permissible range. The reason is that, since the change in the number of multiplexed wavelengths means that the number of multiplexed signal lights (the number of wavelengths) to be a precondition of automatic output level control by the monitor and control unit 20-2 is different from the number of signal lights (the number of wavelengths) actually inputted to or outputted from the optical amplifier 30-2, the execution of automatic output level control is meaningless until a correct total output optical power to be the target of automatic output level control is set up in the monitor and control unit 20-2.

When the number of multiplexed wavelengths has changed, the monitor and control unit 20-2 alters the target value of the total output optical power on the basis of the number of multiplexed signal lights indicated, for instance, by control information transmitted from the upstream side optical transmission apparatus of the optical transmission system by way of the supervisory signal light. The monitor and control unit 20-2 itself may as well discriminate input signal lights of the optical amplifier wavelength by wavelength and detect the current number of multiplexed signal lights. The monitor and control unit 20-3 of the optical transmission apparatus 1C on the opposite side performs similar control operations on received lights to those the monitor and control unit 20-2 of the above-described relaying optical transmission apparatus 1B.

First Embodiment

Figure 2:
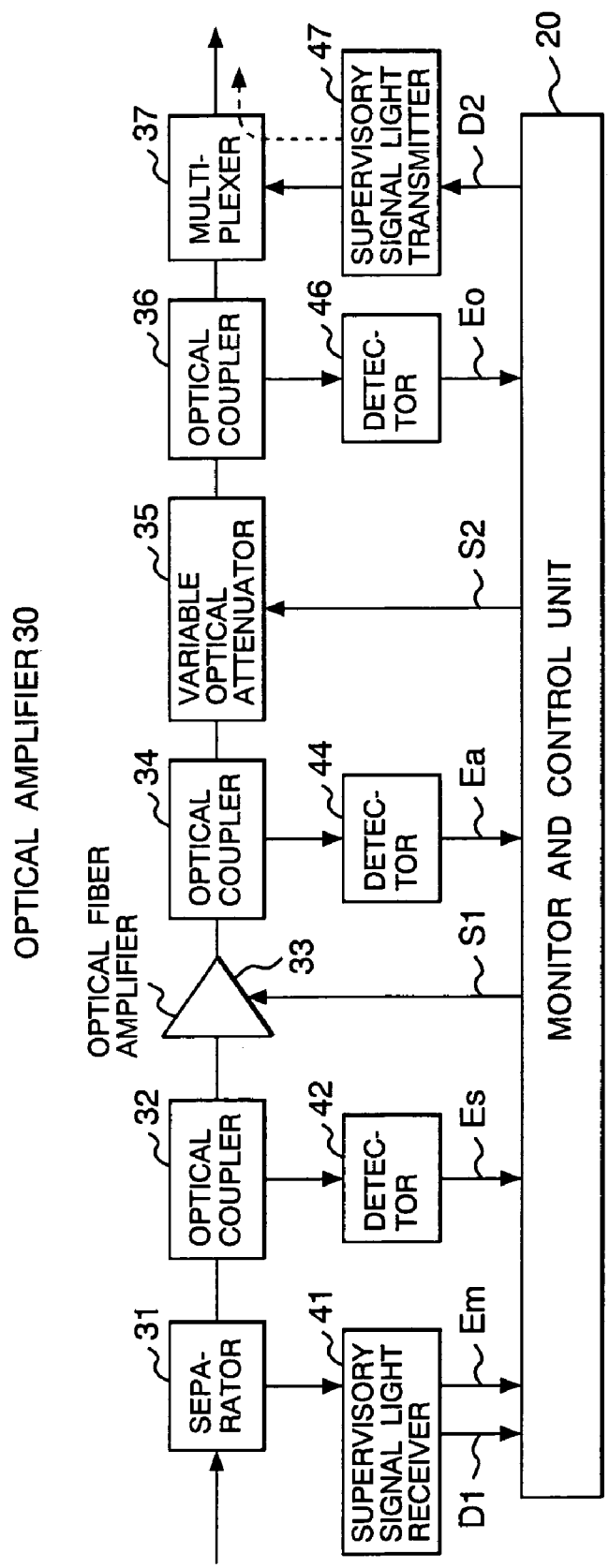
FIG. 2 shows an embodiment of an optical amplifier 30 to be mounted on an optical transmission apparatuses 1 (1A through 1C) of FIG. 1.

FIG. 2 shows an embodiment of the optical amplifier 30 to be mounted on the optical transmission apparatuses 1 of FIG. 1.

The optical amplifier 30 is provided with a separator 31 for separating the supervisory signal light from the optical input to the optical fiber, a first optical coupler 32 for branching part of the signal lights having passed the separator 31, an optical fiber amplifier 33 for optically amplifying signal lights within the signal light wavelength band having passed the optical coupler 32, a second optical coupler 34 for branching part of the output signal lights of the optical fiber amplifier 33, a variable optical attenuator 35 capable of freely adjusting the transmission losses of signal lights outputted from the optical coupler 34, a third optical coupler 36 for branching part of the output signal lights of the optical attenuator 35, a supervisory signal light transmitter 47, and a multiplexer 37 for multiplexing the supervisory signal light outputted from the transmitter 47 and the signal lights having passed the optical coupler 36 and transmitting the multiplexed signals to the output side optical fiber.

The supervisory signal light separated from wavelength-division multiplexed signal lights by the separator 31 is inputted into a supervisory signal light receiver 41, and the supervisory signal light receiver 41 supplies the monitor and control unit 20 with a supervisory signal light power Em and control information D1 extracted from the supervisory signal light. The signal lights branched by the first optical coupler 32 are inputted into a detector 42 and the output of the detector 42 is inputted into the monitor and control unit 20 as a signal light input power Es. The signal lights branched by the second optical coupler 34 are inputted into a detector 44, and the output of the detector 44 is inputted into the monitor and control unit 20 as an amplified signal light power Ea. The signal lights branched by the third optical coupler 36 are inputted into a detector 46, and the output of the detector 46 is inputted into the monitor and control unit 20 as a signal light output power Eo.

The monitor and control unit 20 monitors the optical powers supplied from the supervisory signal light receiver 41 and the detectors 42 through 46, performs the above-described automatic gain control, automatic output level control and control to restrain automatic output level control, and relays the control information D1 received from the supervisory signal light receiver 41 to the supervisory signal light transmitter 47 as control information D2. In performing automatic gain control, the monitor and control unit 20 adjusts the pumping power of the optical fiber amplifier 33 with a control signal S1 to keep the ratio between the signal light input power Es and the amplified signal light power Ea constant all the time. Further, in performing automatic output level control, the monitor and control unit 20 adjusts the extent of attenuation of the variable optical attenuator 35 with a control signal S2 so as to bring the signal light output power Eo to its predetermined target.

Figure 3:
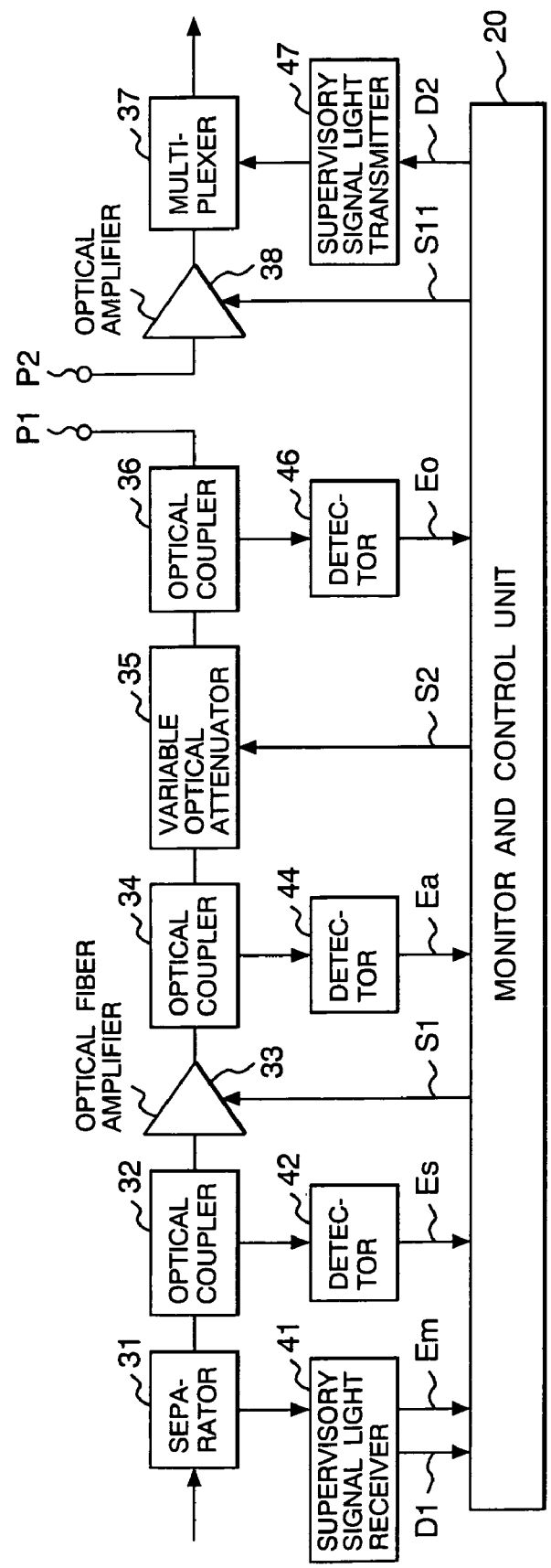
FIG. 3 shows another embodiment of the optical amplifier 30 to be mounted on the optical transmission apparatuses 1 of FIG. 1.

FIG. 3 shows another embodiment of the optical amplifier 30 to be mounted on the optical transmission apparatuses 1.

In the optical amplifier 30 shown here, the optical fiber amplifier has a two-stage configuration comprising a former stage optical amplifying unit 33 under gain control with the control signal S1 and a latter stage optical amplifying unit 38 under gain control with the control signal S11. The input side of the latter stage optical amplifying unit 38 is provided with ports P1 and P2 for connecting with a dispersion compensation device for compensation for wavelength dispersion in the optical fibers. In an optical transmission system in which wavelength dispersion in the optical fiber sections would pose a problem, an optical amplifier connectable to a dispersion compensation device as the one in this embodiment can be useful.

The optical amplifier 30 shown in FIG. 2 and FIG. 3 represents the configuration of the optical amplifier 30-2 to be mounted on the relaying optical transmission apparatus 1B. The optical amplifier 30-1 to be mounted on the optical transmission apparatus 1A on the transmitting side can have a configuration in which the separator 31 and the supervisory signal light receiver 41 are omitted from that shown in FIG. 2 and FIG. 3 because no supervisory signal light entered into it. The optical amplifier 30-3 to be mounted on the optical transmission apparatus 1C on the receiving side, on account of the absence of the following transfer section, can have a configuration in which the multiplexer 37 and the supervisory signal light transmitter 47 are omitted from that shown in FIG. 2 and FIG. 3.

Figures 4A, 4B:
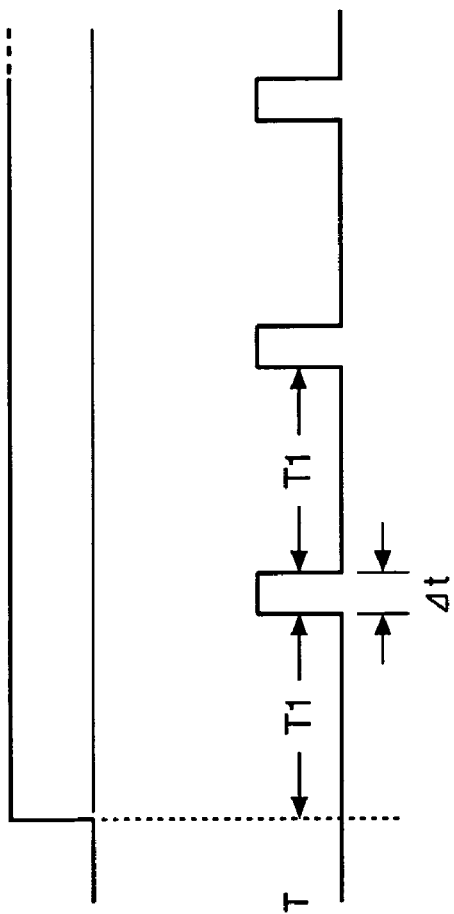
FIG. 4A and FIG. 4B illustrate the relationship between automatic gain control and periodical automatic output level control to be executed by the optical amplifier 30 according to the invention.

FIG. 4A and FIG. 4B illustrate the relationship between automatic gain control executed by the optical amplifier and periodical automatic output level control according to the invention, with the horizontal axis representing the lapse of time.

When the optical transmission apparatuses 1B and 1C are activated and signal lights are inputted into the optical amplifier 30, the monitor and control unit 20 continuously executes automatic gain control as shown in FIG. 4A. According to the invention, automatic output level control is suspended in principle in normal state in which no loss variation occurs in the optical fiber sections, and is intermittently executed only for a short period Δt at regular intervals T1 as shown in FIG. 4B.

Next, the periodical automatic output level control and the forcible automatic output level control executed by the monitor and control units 20 of the optical transmission apparatuses 1B and 1C will be described by referring to the signal waveform diagram shown in FIG. 5A through FIG. 5G. FIGS. 5A, 5F and 5G respectively show variations in the supervisory signal light power Em observed as the output of the supervisory signal light receiver 41, the signal light input power Es observed as the output of the detector 42 and the signal light output power Eo observed as the output of the detector 46.

Each of the monitor and control units 20, as shown in FIG. 5B, updates the threshold values for detecting variations in the supervisory signal light power Em at regular intervals T0. As will be described later by referring to FIG. 6, the threshold for detecting variations in the signal light input power Es is also updated at the same intervals T0. As the threshold values for detecting variations in the supervisory signal light power Em, a first higher threshold Mth (H1), a first lower threshold Mth (L1), a second higher threshold Mth (H2) and a second lower threshold Mth (L2) are variably decided in this embodiment depending on the levels of the supervisory signal light power Em observed at the threshold update points of time as indicated by black dots in FIG. 5A.

The first higher threshold Mth (H1) and the first lower threshold Mth (L1) are used for determining whether or not fluctuations of the supervisory signal light power Em are within a permissible range. For these threshold values, for instance, the ±3 dB values of the supervisory signal light power Em observed periodically (at t1, t2, t3, t4, . . . ) are applied. On the other hand, the second higher threshold Mth (H2) and the second lower threshold Mth (L2) are used for determining whether fluctuations of the supervisory signal light power Em are within the range of output control in which forcible automatic output level control should be executed. For these threshold values, for instance, the ±5 dB values of the observed supervisory signal light power Em are applied.

The cycle T0 for updating the threshold values may be selectable by the system administrator at his own discretion, and T0 has a period sufficiently greater than the varying velocity of the supervisory signal light power to be observed. Applying these variable thresholds updated in the cycles T0, the monitor and control unit 20 can monitor all the time the variations in the supervisory signal light power Em and the signal light input power Es supplied from the supervisory signal light receiver 41 and the detector 42, respectively.

In this embodiment, if the supervisory signal light power Em is between the first higher threshold Mth (H1) and the first lower threshold Mth (L1), the monitor and control unit 20 will judge that loss fluctuations on the transmission path (optical fibers) are within the permissible range, and execute periodical automatic output level control at the intervals of T1 for a short period Δt each time as indicated by 51, 52, . . . in FIG. 5D. When the supervisory signal light power Em fluctuates beyond the permissible range between the first higher threshold Mth (H1) and the first lower threshold Mth (L1) as represented by 61 in FIG. 5A, the monitor and control unit 20 will judge that a large enough loss variation to affect the quality of communication has occurred on the transmission path, and executes forcible automatic output level control for a certain period Δτ as shown in FIG. 5E. As long as the forcible automatic output level control is executed, periodical automatic output level control is restrained as indicated by a doted line 53 in FIG. 5D, and the periodical automatic output level control is resumed with the intervals of T1 (54, . . . ) at the end of the period Δτ.

In the case where the supervisory signal light power Em fluctuates greatly and goes out of the output control range defined by the second higher threshold Mth (H2) and the second lower threshold Mth (L2), the monitor and control unit 20 will judge that power abnormality has arisen in the supervisory signal lights itself, and stops the automatic output level control operation. By suspending automatic output level control when the supervisory signal light power Em fluctuates deviating from the output control range, wrong control operations by the monitor and control unit can be prevented when, for instance, a power supply source for supervisory signal light arranged upstream suddenly stops operating or supervisory signal light is removed.

Since automatic output level control is intermittently performed as long as fluctuations in the supervisory signal light power Em are within permissible range between the first higher threshold Mth (H1) and the first lower threshold Mth (L1) as stated above, the output power Eo of signal lights vary in proportion to power fluctuations of the input lights during the suspension of automatic output level control as shown in FIG. 5G. However, if the values of the threshold update cycles T0, the first higher threshold Mth (H1) and the first lower threshold Mth (L1) are appropriately determined so as to suspend automatic output level control when fluctuations in the supervisory signal light power Em are within the permissible range, it is able to keep the fluctuations in the signal light input power Eo small enough not to affect the quality of communication.

According to the embodiment, the extent of attenuation is periodically adjusted on the output side of the optical fiber amplifier so that the output power Eo of signal lights have the target value at every interval T1, and even if the input power Es of signal lights fluctuates beyond the permissible range during the suspension of automatic output level control, the monitor and control unit 20 will execute forcible automatic output level control. Accordingly, there is no fear of the output power Eo of signal lights fluctuating widely enough to affect the quality of communication.

Next, the operations to restrain automatic output level control required when the number of multiplexed wavelengths has changed will be described by referring to the signal waveform diagram shown in FIG. 6A through FIG. 6E. FIG. 6A shows variations in the signal light input power Es observed as the output of the detector 42 and FIG. 6C shows automatic output level control periodically performed at the intervals of T1.

The monitor and control unit 20, as shown in FIG. 6B, updates an higher threshold Sth (H) and a lower threshold Sth (L) for detecting variations in the signal light input power Es in regular cycles T0. As the higher threshold Sth (H) and the lower threshold Sth (L), the ±3 dB values of the signal light input power Es observed periodically are applied, for instance. By updating the threshold values defining the permissible range in regular cycles T0 in this way, the most suitable thresholds for the current level of received optical power can be set all the time even if, for instance, fluctuations in supervisory signal light power or in signal light power arise in the monitor and control unit 20 reflecting long-term loss fluctuations having occurred on the optical transmission path.

The monitor and control unit 20 is monitoring, in parallel with the aforementioned detection of fluctuations in the supervisory signal light power Em, the fluctuations in the signal light input power Es all the time by applying the variable thresholds Sth (H) and Sth (L) updated in the regular cycles T0. Even though the supervisory signal light power Em is fluctuating within the permissible range between the first higher threshold Mth (H1) and the first lower threshold Mth (L1), if the signal light input power Es deviates from the range between the thresholds Sth (H) and Sth (L) as indicated by 71 in FIG. 6A, the monitor and control unit 20 will judge that the number of multiplexed signal lights (the number of wavelengths) has changed.

When the number of multiplexed signal lights has changed, if the previous target value (total signal light power) is applied to automatic output level control, the optical power per signal light will be controlled to a wrong level. In view of this problem, the monitor and control unit 20 turns on an automatic output level control inhibition flag as shown in FIG. 6D at the point of time tn where it has detected the change in the number of multiplexed signal lights (the number of wavelengths). As long as the automatic output level control inhibition flag is in on state, the execution of periodical automatic output level control is restrained as indicated by a broken line in FIG. 6C. In this period, the execution of forcible automatic output level control is also restrained.

The restraint on automatic output level control by the automatic output level control inhibition flag needs to be continued until the abnormal state of the target value for the automatic output level control in the monitor and control unit 20 is eliminated. Upon turning on the automatic output level control inhibition flag, the monitor and control unit 20 enters into a state of reset-up of control target value as shown in FIG. 6E. In this state, the number of multiplexed wavelengths physically inputted into the optical amplifier 30 is identified, and the automatic output level control inhibition flag is returned to an off state in order to resume automatic output level control, at a timing tm where re-set up of a new total signal light power to be a new target value for automatic output level control has been completed.

The number of multiplexed wavelengths is extracted from supervisory signal light received from the optical transmission apparatus on the upstream side. The monitor and control unit 20 calculates the new total signal light power to be a control target, on the basis of the number of multiplexed wavelengths. Since the control target value for automatic output level control has to be altered for every transmission apparatus of the optical transmission system, each of the monitor and control units 20 returns the automatic output level control inhibition flag to the off state at a point of time where a predetermined length of time has passed after the re-setup of the control target value was completed. Since automatic gain control is carried out continuously even when automatic output level control is restrained in accordance with the inhibition flag, a change in the number of multiplexed wavelengths little affects the output power of signal lights.

Figure 7:
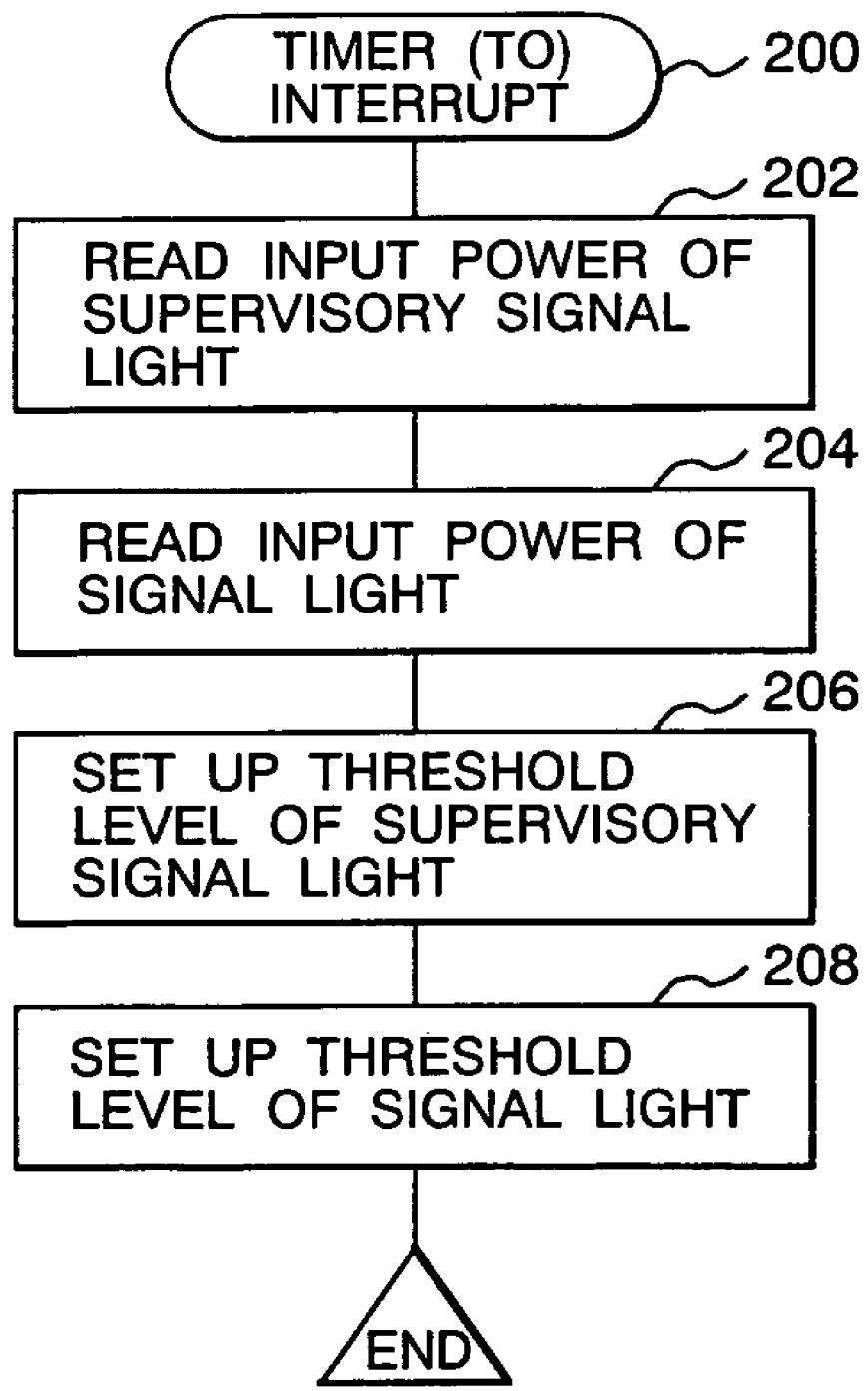
FIG. 7 is a flowchart of a threshold update processing routine to be periodically executed by the monitor and control unit 20.

FIG. 7 is a flowchart of a threshold update processing routine 200 to be periodically executed by the monitor and control unit 20 in response to timer interrupts at intervals of T0.

In the threshold update processing routine 200, the input power Em of the supervisory signal light supplied by the supervisory signal light receiver 41 is read in (step 202), and the input power Es of wavelength-division multiplexed signal lights supplied by the detector 42 is read in (204). Then, with the input power Em of the supervisory signal light as reference, the values of the first higher threshold Mth (H1), the first lower threshold Mth (L1), the second higher threshold Mth (H2) and the second lower threshold Mth (L2) are calculated according to predetermined mathematical formulas, and these values are stored as thresholds for determining the quantities of supervisory signal light variations (206). Further, with the signal light input power Es as reference, the values of the higher threshold Sth (H) and the lower threshold Sth (L) are calculated according to predetermined mathematical formulas, and these values are stored as thresholds for determining the quantities of signal light variations (208).

Incidentally, instead of calculating the threshold values, a conversion table may be prepared to indicate the values of Mth (H1), Mth (L1), Mth (H2) and Mth (L2) calculated in advance for each predictable value of Em, for instance. The conversion table can be searched for each threshold on every occasion of threshold update with the observed value of Em as the search key. This method is also applicable to the thresholds Sth (H) and Sth (L).

Figure 8:
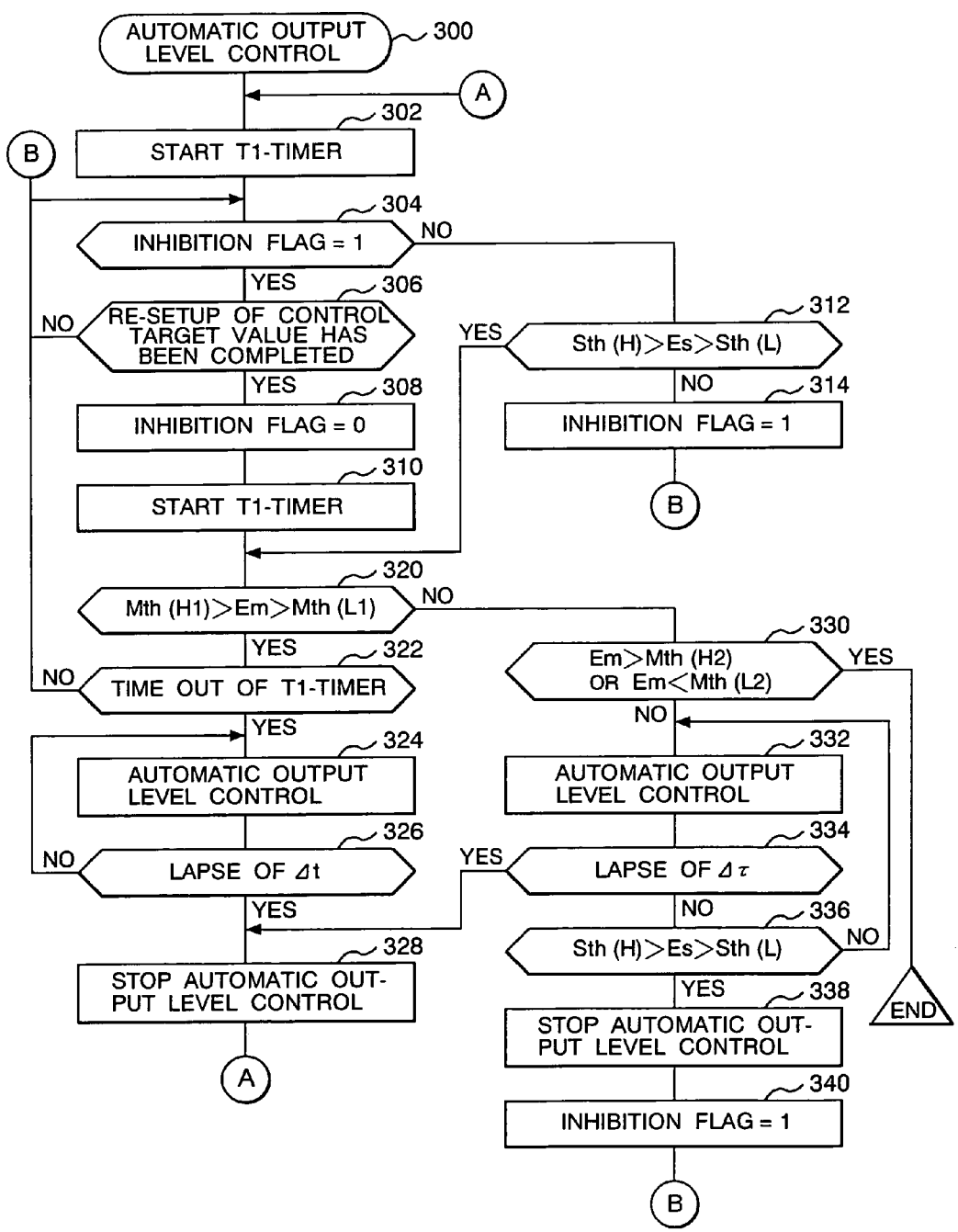
FIG. 8 is a flowchart of an automatic output level control routine to be executed by the monitor and control unit 20.

FIG. 8 is a flowchart of an automatic output level control routine 300 to be executed by the monitor and control unit 20.

In the automatic output level control routine 300, the monitor and control unit 20 starts a T1-timer indicating the lapse of a length of time T1 (step 302) and checks the status of the automatic output level control inhibition flag (304). When the inhibition flag is in on state ("1"), the monitor and control unit 20 checks whether the re-setup of the control target value has been completed (306). If the re-setup of the control target value has not been completed, the control sequence returns to step 304. If the re-setup of the control target value has been completed, the monitor and control unit 20 changes the inhibition flag to an off state ("0") (308), starts the T1-timer (310), and checks the power Em of the supervisory signal light (320).

When the inhibition flag is in off state at step 304, the monitor and control unit 20 reads in the signal light input power Es supplied by the detector 42, and determines whether the signal light input power Es is within the permissible range between the higher threshold Sth (H) and the lower threshold Sth (L) (312). If the input power Es of the signal light is within the permissible range, step 320 for automatic output level control will be executed. If the input power Es of the signal light is out of the permissible range, the monitor and control unit 20 sets the inhibition flag to an on state (314) and returns the control sequence to step 304. It will be understood from this control sequence that automatic output level control is restrained while the inhibition flag is in on state.

At step 320, the monitor and control unit 20 reads in the input power Em of the supervisory signal light supplied by the supervisory signal light receiver 41, and checks whether the input power Em of the supervisory signal light is within the permissible range between the first higher threshold Mth (H1) and the first lower threshold Mth (L1). If the input power Em of the supervisory signal light is within the permissible range, the monitor and control unit 20 checks whether the T1-timer has been expired (322) and, if not, it returns the control sequence to step 304.

The monitor and control unit 20 executes automatic output level control at the point of time where the T1-timer has been expired (324). Then, the monitor and control unit 20 reads in the output power Eo of wavelength-division multiplexed signal lights supplied by the detector 46, compares the power Eo with a control target value designated in advance, and outputs the control signal S2 for adjusting the extent of attenuation of the optical attenuator 35 so as to make the power Eo equal to the control target value. The automatic output level control here is executed repeatedly until a period of time Δt has passed since the start of the control. Upon the lapse of the period of time Δt (326), the monitor and control unit 20 stops the automatic output level control (328), and returns the control sequence to step 302 to re-start the T1-timer.

If the input power Em of the supervisory signal light is found beyond the permissible range at step 320, the monitor and control unit 20 will check whether the input power Em of the supervisory signal light is within the output control range defined by the second higher threshold Mth (H2) and the second lower threshold Mth (L2) (330). If the input power Em of the supervisory signal light is found beyond the output control range, the monitor and control unit 20 will determined that the supervisory signal light has run into an abnormal state and terminates the automatic output level control routine 200. If the input power Em of the supervisory signal light remains within the output control range, the monitor and control unit 20 will execute forcible automatic output level control for the period of time Δτ (332). Then, similarly to the periodical automatic output level control executed at step 324, the extent of attenuation of the optical attenuator 35 is adjusted with the control signal S2 so that the output power Eo of signal lights has the control target value.

Since the forcible automatic output level control is executed for the period Δτ longer than the periodical automatic output level control period Δt, there is possibility that the number of multiplexed wavelengths may change during the automatic output level control. For this reason, during the execution of forcible automatic output level control, the monitor and control unit 20 checks whether the period Δτ has elapsed in every control cycle from the reading of the signal light input power Es until the output of the control signal S1 (334). If the period Δτ has not elapsed, the monitor and control unit 20 will determine whether the input power Es of signal lights supplied by the detector 42 is within the permissible range between the higher threshold Sth (H) and the lower threshold Sth (L) (336). If the signal light input power Es is within the permissible range, the control sequence returns to step 330 to repeat the automatic output level control cycle. If the signal light input power Es goes out of the permissible range, the monitor and control unit 20 judges that the number of multiplexed wavelengths has changed. In this case, the monitor and control unit 20 stops automatic output level control (338), sets the inhibition flag in an on state (340), and returns the control sequence to step 304.

According to the flowchart, automatic output level control at step 324 is repeated based on the assumption that the probability for the number of multiplexed wavelengths to change during the execution of automatic output level control is very low because the execution period Δt of periodical automatic output level control is short, but the operations of periodical automatic output level control may also be stopped immediately upon the detection of any change in the number of multiplexed wavelengths by performing a similar determination to step 336.

Second Embodiment

In the first embodiment described above, as the monitor and control unit 20 terminates the supervisory signal light for every section of the optical fiber and a new supervisory signal light is transmitted to the next section from the supervisory signal light transmitter 47 as shown in FIG. 2, the monitor and control unit 20-3 of the optical transmission apparatus 1C shown in FIG. 1, for instance, cannot detect the presence or absence of any loss variation in the first optical fiber transfer section 2-1 and the extent of loss variation if it occurs. Therefore, when a loss variation occurs in the first optical fiber transfer section 2-1 and a variation is left in the signal light output power Eo because of incomplete compensation for the signal light output power Eo in the optical transmission apparatus 1B for some reason, optical signals manifesting a power variation beyond the permissible range may eventually be relayed to the transfer section 2-2. In this case, the monitor and control unit 20-3 of the optical transmission apparatus 1C on the downstream side has possibility of making mistake the variation in the input power of the received signal lights for a change in the number of wavelengths because the power variation of the supervisory signal light is within the permissible range.

Figure 9:
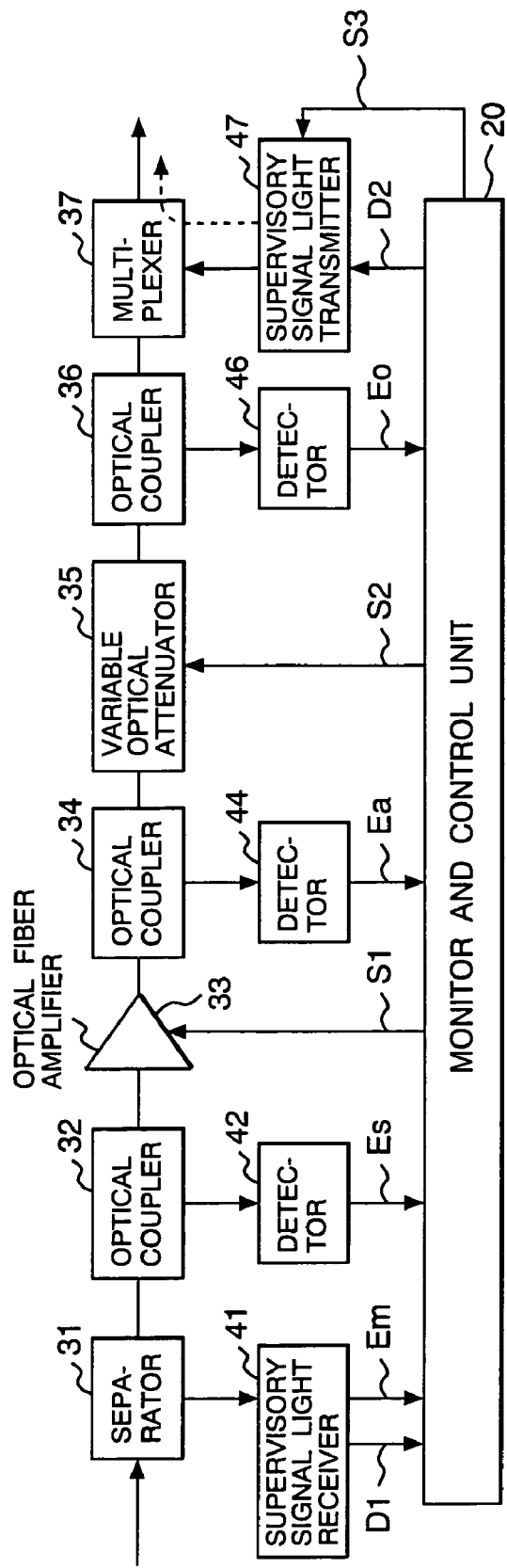
FIG. 9 shows still another embodiment of the optical amplifier 30 to be mounted on the optical transmission apparatuses 1 of FIG. 1.

In order to eliminate the aforementioned wrong perception in the optical transmission apparatus on the downstream side, the optical amplifier in the second embodiment is characterized in that the monitor and control unit 20 intentionally varies the output power of the supervisory signal light supplied from the supervisory signal light transmitter 47 with a control signal S3 as shown in FIG. 9. In this case, the monitor and control unit 20 can relay the loss fluctuation occurring in the preceding transfer section to the optical transmission apparatus of the following stage by reflecting the variation in the supervisory signal light power Em detected by the supervisory signal light receiver 41 to the power of a new supervisory signal light supplied from the supervisory signal light transmitter 47.

Figure 10:
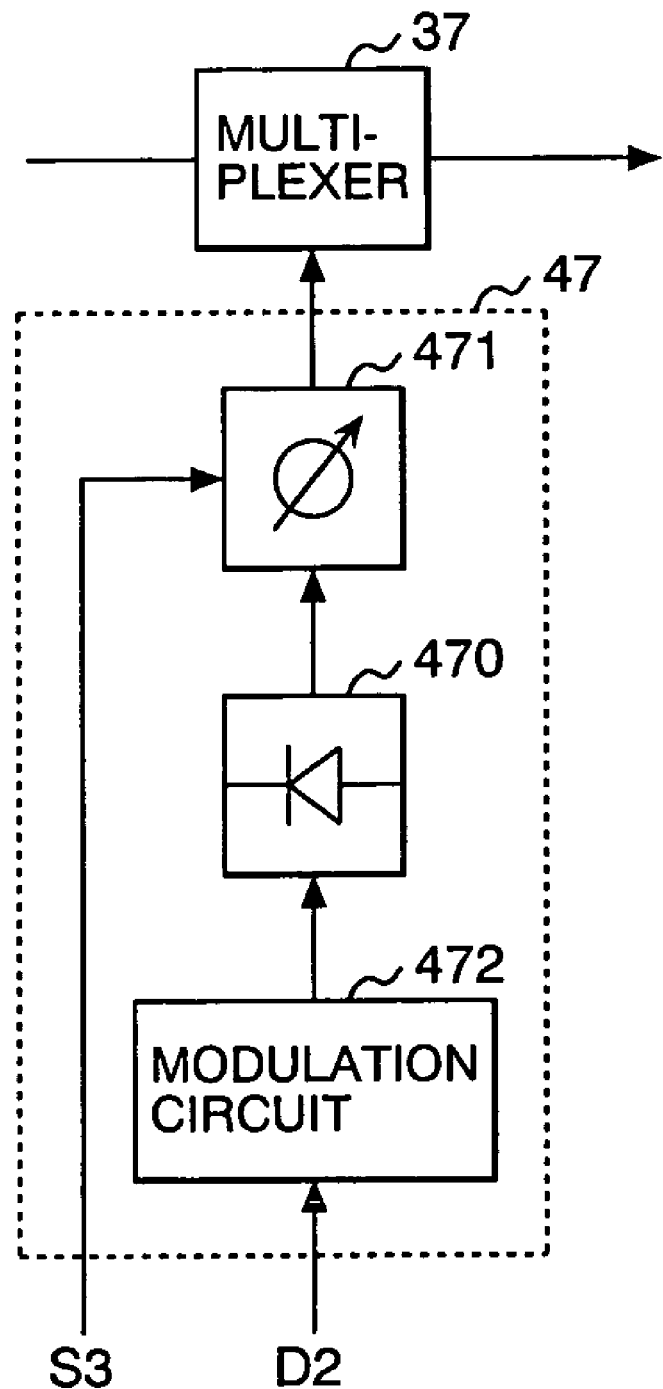
FIG. 10 shows a principal part of a supervisory signal light transmitter in the optical amplifier 30 of FIG. 9.

In order to vary the power of the supervisory signal light, for instance, the driving bias current for a laser diode in a supervisory signal light transmitter 7 may be controlled with the control signal S3. As shown in FIG. 10, a variable optical attenuator 471 may be inserted into the output light path of a laser diode 470 driven by a modulation circuit 472. In this case, the power of the supervisory signal light inputted into the multiplexer 37 may be varied by having the monitor and control unit 20 control the variable optical attenuator 471 as in the control of the optical attenuator 35.

In this embodiment, the monitor and control unit 20 generates the control signal S3 which varies in proportion to the supervisory signal light power Em of the preceding transfer section read in from the supervisory signal light receiver 41, thereby to vary the power of the supervisory signal light supplied from the supervisory signal light receiver 41 in the same way as the supervisory signal light power Em. The variation in the supervisory signal light power is observed at the monitor and control unit 20-3 mounted on the optical transmission apparatus 1C on the downstream side. The monitor and control unit 20-3 operates similarly to the monitor and control unit 20 described with reference to the first embodiment, and executes periodical automatic output level control when the observed supervisory signal light power Em is fluctuating within the permissible range between higher threshold Mth (H1) and the first lower threshold Mth (L1) The monitor and control unit 20-3 executes forcible automatic output level control when the supervisory signal light power Em goes out of the permissible range.

As stated above, according to the embodiment, even if the compensation for the signal light output power Eo in the optical transmission apparatus 1B is incomplete and any fluctuation remains in the signal light output power Eo from the optical transmission apparatus of the preceding stage, it will not be erroneously detected as a change in the number of multiplexed wavelengths as long as it is due to a loss variation on the transmission path because the observed supervisory signal light power Em is also fluctuating. Although forcible automatic output level control is executed when fluctuations in the signal light input power Es observed by the monitor and control unit 20-3 are within the permissible range and fluctuations in the supervisory signal light power Em deviate from the permissible range, automatic output level control is allowed to be executed except when the number of multiplexed wavelengths changes. Therefore, there is no trouble even if partial differences exist between the signal light input power Es and the supervisory signal light power Em in fluctuating pattern.

Third Embodiment

The third embodiment is characterized in that, in the optical amplifier of FIG. 9, the power of a new supervisory signal light supplied from the supervisory signal light transmitter 47 is varied in proportion to the light power Ea of the amplified signal outputted from the optical fiber amplifier 33.

In this embodiment, the monitor and control unit 20 varies the control signal S3 according to the amplified signal light power Ea supplied from the detector 44, and the driving bias current of the laser diode 470 of the supervisory signal light transmitter 47 or the extent of attenuation of the optical attenuator 471 is controlled with this control signal S3. According to the embodiment, as the multiplexed signal light power and the supervisory signal light power are varying in association with each other at the time of output from the relaying optical transmission apparatus, there is no fear for the following optical transmission apparatus to mistake any fluctuation in the multiplexed signal light power for a change in the number of multiplexed wavelengths.

As apparent from the embodiments described above, the present invention can secure the quality of communication of signal lights in an optical transmission system by discriminating two types of variations occurring in the optical transmission system from each other, including a variation in losses arising in the transmission path and a change in the number of multiplexed wavelengths occurring in usual maintenance work, and selectively executing automatic output level control of optical amplifiers. Further, according to the second and third embodiments of the invention, even if the compensation for signal light output power is incomplete in automatic output level control performed depending on the loss variations in the transmission path, erroneous operations by the following optical transmission apparatus can be prevented.

What is claimed is:

1. An optical transmission apparatus for outputting wavelength-division multiplexed signal lights received together with a supervisory signal light to an optical transmission path of a next section with a predetermined optical power, comprising:
   first means for separating the supervisory signal light from the received wavelength-division multiplexed signal lights and detecting the power of the supervisory signal light;
   second means for detecting the power of the wavelength-division multiplexed signal lights after the separation of the supervisory signal light;
   a gain control type optical amplifier for amplifying said wavelength-division multiplexed signal lights;
   an optical attenuator variable in the extent of attenuation for adjusting the power level of the wavelength-division multiplexed signal lights outputted from said optical amplifier; and
   a monitor and control unit for controlling said optical amplifier to keep a constant gain and controlling the extent of attenuation of said optical attenuator so that the output power of the wavelength-division multiplexed signal lights has a predetermined target value, wherein:
   said monitor and control unit restrains said automatic output level control by said optical attenuator when the power of said supervisory signal light detected by said first means is fluctuating within a permissible range and fluctuations in the wavelength-division multiplexed signal light power detected by said second means has deviated from its permissible range.

2. The optical transmission apparatus according to claim 1, wherein:
   said monitor and control unit is provided with means for executing automatic output level control by said optical attenuator intermittently in predetermined cycles when the power of said supervisory signal light is fluctuating within a permissible range and fluctuations in said wavelength-division multiplexed signal light power are within its permissible range.

3. The optical transmission apparatus according to claim 2, wherein:
   said monitor and control unit is provided with means for updating, at regular intervals, thresholds for defining said permissible range of said supervisory signal light variation depending on the supervisory signal light power detected by said first means, and thresholds for defining said permissible range of said wavelength-division multiplexed signal light variation depending on the wavelength-division multiplexed signal light power detected by said second means.

4. The optical transmission apparatus according to claim 2, wherein:
   said monitor and control unit has means for re-setting up the target value of said output power of wavelength-division multiplexed signal lights based on the number of wavelength-division multiplexed signal lights indicated by control information carried by said supervisory signal light, and releases said output optical power from the restraint on automatic output level control after the re-setup of the target value.

5. The optical transmission apparatus according to claim 1, wherein:
   said monitor and control unit is provided with means for executing the automatic output level control by said optical attenuator forcibly for a predetermined period when the power of said supervisory signal light fluctuates beyond the permissible range.

6. The optical transmission apparatus according to claim 5, wherein:
   said monitor and control unit is provided with means for suspending said automatic output level control if said signal light power deviates from its permissible range when the automatic output level control is executed in said predetermined period.

7. The optical transmission apparatus according to claim 1, wherein:
   said monitor and control unit is provided with means for updating, at regular intervals, thresholds for defining said permissible range depending on the supervisory signal light power detected by said first means.

8. The optical transmission apparatus according to claim 1, wherein:
   said monitor and control unit is provided with means for executing, when the power of said supervisory signal light fluctuates beyond the permissible range, automatic output level control by said optical attenuator forcibly for a predetermined period if the power of said supervisory signal light is within a predetermined output control range, and terminating automatic output level control by said optical attenuator if the power of said supervisory signal light fluctuates beyond the output control range.

9. The optical transmission apparatus according to claim 8, wherein:
   said monitor and control unit is provided with means for suspending said automatic output level control if said signal light power deviates from its permissible range when the automatic output level control is executed in said predetermined period.

10. The optical transmission apparatus according to claim 1, further comprising:

a supervisory signal light transmitter for generating a supervisory signal light to be transmitted to the optical transmission path of a next section, and a multiplexer for multiplexing the supervisory signal light outputted from said supervisory signal light transmitter with the wavelength-division multiplexed signal lights outputted from said optical attenuator and transmitting the multiplexed lights to the optical transmission path of said next section, wherein:

said monitor and control unit varies the power of the supervisory signal light outputted from said supervisory signal light transmitter according to the supervisory signal light power outputted from said first means.

11. The optical transmission apparatus according to claim 1, further comprising:

a supervisory signal light transmitter for generating a supervisory signal light to be transmitted to the optical transmission path of a next section, a multiplexer for multiplexing the supervisory signal light outputted from said supervisory signal light transmitter with the wavelength-division multiplexed signal lights outputted from said optical attenuator and transmitting the multiplexed lights to the optical transmission path of said next section, and third means for detecting the optical power of the wavelength-division multiplexed signal lights outputted from said optical amplifier, wherein:

said monitor and control unit varies the power of the supervisory signal light outputted from said supervisory signal light transmitter according to the output from said third means.

12. A control method for an optical transmission apparatus which amplifies wavelength-division multiplexed signal lights received together with a supervisory signal light with a constant gain, and transmits amplified lights to an optical transmission path of a next section after adjusting output power level, comprising the steps of:

detecting the power of the supervisory signal light separated from the received wavelength-division multiplexed signal lights;

detecting the power of the wavelength-division multiplexed signal lights after the separation of the supervisory signal light;

amplifying the wavelength-division multiplexed signal lights with a constant gain;

executing automatic output level control of the amplified wavelength-division multiplexed signal lights according to a predetermined target value; and monitoring said detected supervisory signal light power and said detected wavelength-division multiplexed signal light power, and restraining the automatic output level control when the supervisory signal light power is fluctuating within its permissible range and fluctuations in the wavelength-division multiplexed signal light power has deviated from its permissible range.

* * * * *